US009353262B2

(12) United States Patent
Tarbit et al.

(10) Patent No.: US 9,353,262 B2
(45) Date of Patent: May 31, 2016

(54) COMPOSITIONS, METHODS AND ARTICLES PRODUCED BY COMPOUNDING POLYAMIDES WITH OLEFIN-MALEIC ANHYDRIDE POLYMERS

(75) Inventors: Brian Tarbit, Ashington (GB); Ashok M. Adur, Westlake, OH (US)

(73) Assignee: Vertellus Specialties Inc., Indianapolis, IN (US)

( * ) Notice: Subject to any disclaimer, the term of this patent is extended or adjusted under 35 U.S.C. 154(b) by 67 days.

(21) Appl. No.: 13/817,510

(22) PCT Filed: Aug. 16, 2011

(86) PCT No.: PCT/US2011/047872
§ 371 (c)(1),
(2), (4) Date: Feb. 18, 2013

(87) PCT Pub. No.: WO2012/024268
PCT Pub. Date: Feb. 23, 2012

(65) Prior Publication Data
US 2013/0150517 A1  Jun. 13, 2013

Related U.S. Application Data

(60) Provisional application No. 61/374,817, filed on Aug. 18, 2010, provisional application No. 61/485,826, filed on May 13, 2011, provisional application No. 61/493,058, filed on Jun. 3, 2011.

(51) Int. Cl.
*C08L 77/00* (2006.01)
*C08L 77/02* (2006.01)
(Continued)

(52) U.S. Cl.
CPC ............ *C08L 77/00* (2013.01); *C08L 35/02* (2013.01); *C08L 77/02* (2013.01); *C08L 77/06* (2013.01); *C08L 23/0869* (2013.01)

(58) Field of Classification Search
CPC ...... C08L 35/02; C08L 77/00; C08L 23/0869
USPC ........................................................ 524/514
See application file for complete search history.

(56) References Cited

U.S. PATENT DOCUMENTS 3,388,186 A   6/1968  Kray
3,465,059 A   9/1969  Seven
(Continued)

FOREIGN PATENT DOCUMENTS

CN   101230193 A   7/2008
DE     4223864 A1   1/1994
(Continued)

OTHER PUBLICATIONS

Vertellus Company Introduction, George Jong, 2011, Obtained at http://www.adhesive-lin.com/system_dntb/upload/2011113112841435.pdf.*
(Continued)

*Primary Examiner* — Ling Choi
*Assistant Examiner* — Lanee Reuther
(74) *Attorney, Agent, or Firm* — Barnes & Thornburg LLP

(57) ABSTRACT

The disclosure of the present application provides compositions and methods of compounding polyamides comprising the steps of forming a polyamide mixture, comprising a polyamide with an olefin maleic anhydride copolymer, and compounding the polyamide mixture at its processing temperature. Compounded polyamides derived from recycled nylon and other recycled polyamides and methods for preparing the compounded polyamides are described.

20 Claims, 1 Drawing Sheet

(51) Int. Cl.
*C08L 77/06* (2006.01)
*C08L 35/02* (2006.01)
*C08L 23/08* (2006.01)

(56) References Cited

U.S. PATENT DOCUMENTS

| | | | |
|---|---|---|---|
| 3,516,961 | A | 6/1970 | Robb |
| 3,668,274 | A | 6/1972 | Owens |
| 3,673,277 | A | 6/1972 | Schmitt et al. |
| 3,845,163 | A | 10/1974 | Murch |
| 4,174,358 | A | 11/1979 | Epstein |
| 4,351,931 | A | 9/1982 | Armitage |
| 4,448,956 | A * | 5/1984 | Lenke et al. ............ 528/312 |
| 5,112,908 | A | 5/1992 | Epstein et al. |
| 5,244,971 | A | 9/1993 | Jean-Marc |
| 5,346,963 | A | 9/1994 | Hughes |
| 5,482,997 | A | 1/1996 | Debets et al. |
| 5,889,112 | A | 3/1999 | Shih et al. |
| 6,008,297 | A | 12/1999 | Tanaka |
| 7,671,127 | B2 * | 3/2010 | Weber et al. ............ 524/504 |
| 2001/0049424 | A1 | 12/2001 | Petiniot et al. |
| 2004/0013833 | A1 | 1/2004 | Lee et al. |
| 2006/0148988 | A1 * | 7/2006 | Chou ..................... 525/191 |
| 2007/0154697 | A1 * | 7/2007 | Cossement et al. ...... 428/292.1 |

FOREIGN PATENT DOCUMENTS

| | | |
|---|---|---|
| EP | 0234819 A2 | 9/1987 |
| EP | 0693532 A2 | 1/1996 |
| JP | 62-250053 A | 10/1987 |
| WO | 90/07556 A1 | 7/1990 |
| WO | WO 99/07769 A2 | 4/1999 |
| WO | 03/099930 A1 | 12/2003 |
| WO | WO 03099930 A1 * | 12/2003 |
| WO | 2012/024268 A1 | 2/2012 |
| WO | 2014/008330 A2 | 1/2014 |
| WO | 2014/152538 A1 | 9/2014 |

OTHER PUBLICATIONS

Zemac Copolymers Product Information. Obtained Dec. 30, 2014 at http://www.vertellus.com/products/plastics-polymers/zemac-co-polymers.*
PCT Search Report and Written Opinion for PCT/US2011/047872, completed Jan. 5, 2012.
English abstract of JP 62-250053 A, Original Document Published Oct. 30, 1987.
Google translation of CN101230193, Original Document Published Jul. 30, 2008.
DWPI Patent Record for EP0693532, Original Document Published Jan. 24, 1996.
DWPI Patent Record for DE4223864, Original Document Published Jan. 27, 1994.
PCT International Search Report and Written Opinion for PCT/US2013/049201 completed by the US Searching Authority on Dec. 3, 2013.
Jul. 30, 2008 Google translation of CN101230193, Jul. 30, 2008.
DWPI Patent Record for EP0693532, Obtained Nov. 14, 2013.
Extended European Search Report for EP11818646.9 completed on Apr. 4, 2014.
DWPI Patent Record for DE4223864, Obtained Nov. 14, 2013.
PCT International Search Report and Written Opinion for PCT/US2014/027451 completed by the US Searching Authority on Jun. 30, 2014.
English abstract of JP 62-250053 A, Oct. 30, 1987.

* cited by examiner

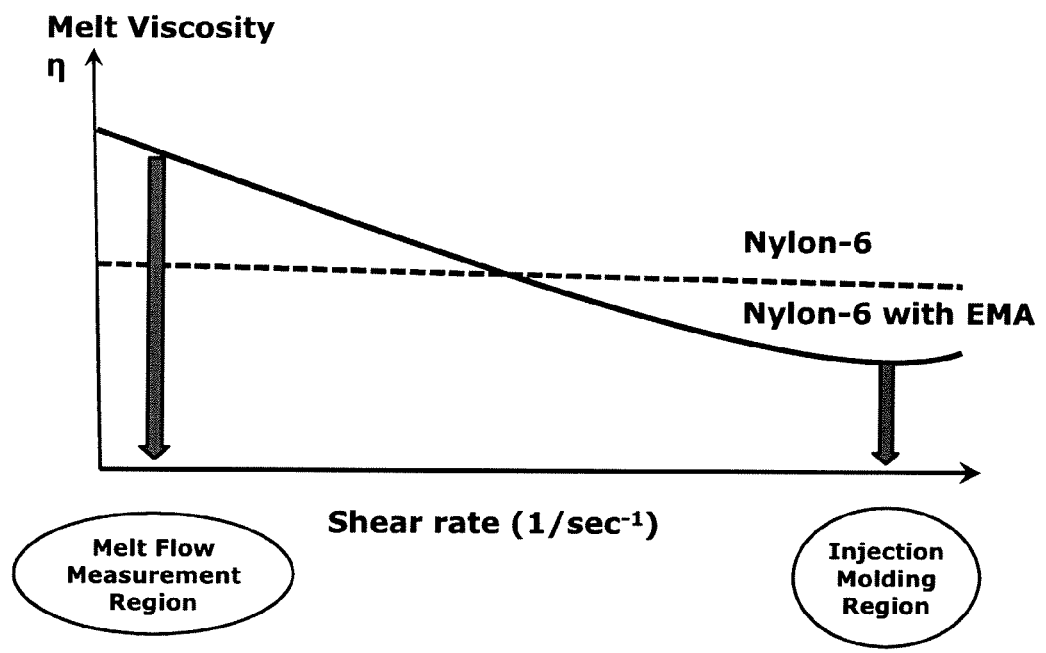

COMPOSITIONS, METHODS AND ARTICLES PRODUCED BY COMPOUNDING POLYAMIDES WITH OLEFIN-MALEIC ANHYDRIDE POLYMERS

CROSS-REFERENCE TO RELATED APPLICATIONS

This application is a national stage entry under 35 USC §371(b) of International Application No. PCT/US2011/047872, filed Aug. 16, 2011, which claims priority under 35 U.S.C. §119(e) to U.S. Provisional Application Ser. Nos. 61/374,817, filed Aug. 18, 2010; 61/485,826 filed May 13, 2011; and 61/493,058, filed Jun. 3, 2011. The entirety of the disclosures of each of these applications are incorporated herein by reference.

A polyamide is a polymer containing repeating units of amides. These polymers can occur both naturally, with examples being proteins, such as wool and silk, and can be made artificially through step-growth polymerization, with examples being nylons, aramids, and sodium poly(aspartate). Currently, polyamides are commonly used in textiles, automobiles, carpet and sportswear due to their extreme durability and strength.

One subset of polyamides, the nylons, is one of the most commonly created subsets of synthetic polymers. Nylons are typically condensation copolymers formed by reaction of dicarboxylic acids with diamines or by ring opening of lactams. Various nylon polymers can be created by adjusting the number of carbons. Conventional nomenclature designates in these various nylons and polyamides specify the diamine first and the diacid second. Therefore, the most commercially common variant of nylon, nylon 6-6, has six carbons donated by the diamine, and six carbons from the diacid, and nylon 6-12 would have six carbons donated by the diamine and twelve carbons donated from the diacid. Distinct from nylon 6-6, nylon-6 is a homopolymer formed by a ring-opening polymerization. An example of this is nylon-6 produced by polymerizing caprolactam. Because each variant has a differing chemical structure, the physical properties of the nylons differ with regard to their impact resistance, tensile strength, elasticity, tear strength, melt temperature, color fastness, and other properties.

Olefin-maleic anhydride polymers (OMAP) are formed by copolymerizing maleic anhydride with olefin monomers. Examples of such olefins include ethylene, propylene, isobutylene, butene-1, octene, butadiene, styrene, isoprene, hexene, long chain alkenes (e.g. dodecene, dodecene-1, tetradecene), and the like. Some of these olefins are derived from natural gas and/or crude oil, whereas others are derived from natural substances or by biosynthesis. Examples of such copolymers include but are not limited to ethylene-maleic anhydride, propylene-maleic anhydride, isobutylene-maleic anhydride copolymers and terpolymers such as ethylene-propylene-maleic anhydride terpolymer.

It will be appreciated that products which are made from polyamides are exposed to considerable stresses during manufacture and processing, and that a method for producing nylons or other polyamides with increased durability would be appreciated in the art, and that specific nylon formulations having increased durability will be greatly appreciated in the art.

BRIEF DESCRIPTION OF THE DRAWINGS

FIG. 1 Shows reduction of viscosity at high shear resulting from compounding a nylon (e.g. nylon-6) with EMA.

DESCRIPTION

The disclosure of the present application provides for compositions comprising polyamides with such olefin-maleic anhydride polymers (OMAP).

The disclosure of the present application also provides various methods for producing compounds of polyamides with ethylene maleic anhydride copolymers (EMA). Specifically, at least one embodiment of the present disclosure relates to methods for the reaction of nylon-like materials with ethylene maleic anhydride copolymers. At least one embodiment of the present disclosure involves processing methods such as extrusion compounding using equipment known to one skilled in the art. In the plastics industry, compounding is a process that mixes one or more polymers with one or more additives to produce plastic compounds in one or more steps. The feeds may be pellets, powder and/or liquids, but the product is usually in pellet form, to be used in other plastic-forming processes such as extrusion and injection molding. Machine size varies from tiny lab machines to the biggest extruders in the industry, running as much as 20 tons per hour. Usually twin-screw extruders are preferred because they give better mixing at lower melt temperatures. Most of these have screws and barrels made up of smaller segments (mixing, conveying, venting and additive feeding) so that the design and sequence of addition of each of the ingredients in the formulation can be changed to meet the production and product needs. Other equipment such as single-screw extruders, oscillating screw extrusion, continuous mixers, Banbury mixers, and planetary extruders can be used for compounding as well. The additional components to be mixed and/or compounded (viscosity modifiers, additive carriers, and the like) and the processing parameters such as temperature of each of the zones, feed rates, residence time and screw speed can be modified by the person skilled in the art for each application. The method of producing compounds of polyamides according to at least one embodiment of the present application results in a compounded polymer with improvements in properties and performance such as increased stretch performance, impact strength, creep resistance, and resistance to anti-freeze degradation due to hydrolysis of the compound formed by reacting polyamide with olefin-maleic anhydride polymer.

According to at least one embodiment of the method of producing compounded polyamides of the present disclosure, the method comprises the step of compounding a polyamide with an ethylene maleic anhydride copolymer in a twin screw extruder or other processing method listed in the previous paragraph. Such pellets are subsequently processed by a plastic processing method such as injection molding, blown or cast film, sheet extrusion, thermoforming, or blow molding, into a finished article such as bottle, molded part, film, sheet, fabric, filament, fiber, etc.

Another embodiment includes directly extruding such a reaction mixture into a finished article such as a filament, fiber, film, sheet, and molded part.

In producing compounds of the present disclosure, a polyamide may be any appropriate polyamide as described herein. For instance, in an exemplary embodiment, the polyamide may be a nylon, such as nylon-6 or nylon 6-6. Additionally, polyamides used in at least one embodiment of the method of producing a compound polyamide may be aliphatic, alicylic and aromatic polyamides such as one or more of nylon 6-12, nylon 4-6, nylon 9 nylon 10, nylon 6-9, nylon 11, nylon 12, nylon 5-10, nylon-meta-xylene diamine (nylon-MXD6), Kevlar® (DuPont), Nomex® (DuPont), Ixef® (Solvay Advanced Polymers), Trogamid® (Evonik Degussa), and Amodel® (Solvay Advanced Polymers). Further, according to at least one exemplary embodiment of the method of producing a compounded polyamide, the olefin-maleic anhydride like an ethylene maleic anhydride alternating copolymer (EMA) may be used in the treatment method in a molar ratio of ethylene to maleic anhydride of about 1:1. In alternative embodiments, the olefin-maleic anhydride like an ethylene maleic anhydride alternating copolymer (EMA) used in the treatment method in a molar ratio of ethylene to maleic anhydride of about 1:99 to about 99:1 may be utilized. Further alternative embodiments employ non-alternating copolymers or random copolymers with a molar ratio of ethylene to maleic anhydride range of about 1:50 to about 50:1; about 1:20 to about 20:1; about 1:10 to about 10:1; about 1:5 to about 5:1; and about 1:2 to about 2:1. In yet another embodiment, non-alternating copolymers or random copolymers may be utilized.

Additionally, according to at least one exemplary embodiment, the olefin-maleic anhydride selected for reaction with a polyamide has a weight average molecular weight of in the range of about 300 to about 10 million; about 10,000 to about 1 million; about 20,000 to about 800,000; about 40,000 to about 600,000; about 50,000 to about 500,000; or about 60,000 to about 400,000. For example, according to at least one exemplary embodiment, the EMA selected may have a molecular weight of about 60,000 such as that sold under the trademark ZeMac® E-60 (E60), or the EMA selected may have a molecular weight of about 400,000 such as that sold under the trademark ZeMac® E-400 (Vertellus Specialties Inc.) (E400). Moreover, the EMA may be used in an exemplary embodiment of the method of producing a compounded polyamide at a concentration of between about 0.01% to about 20.0% w/w; about 0.02% to about 0.5%; about 0.05% to about 7.0% w/w; about 0.1% to about 5.0% w/w; or about 0.5% to about 3.0% w/w.

According to at least one optional embodiment, a stabilizer package is added into the formulation, the stabilizer package comprising additives used individually or in combination with one another. According to one such embodiment, the additives may comprise phenolic antioxidants, phosphites, cuprous iodide (CuI), potassium iodide (KI), and/or other stabilizers. Optionally, the stabilizing package may comprise about 0.01% to about 5.0% w/w of the overall reaction mixture; about 0.1% to about 2.0% w/w; or about 0.5% to 1.0% w/w.

Several illustrative embodiments of the invention are described by the following enumerated clauses:

1. A thermoplastic pelletizable polymer composition comprising:
    (a) a polyamide; and
    (b) a polymer polymerized from maleic anhydride and an olefin; wherein the polyamide and the polymer are compounded.
2. The thermoplastic pelletizable polymer composition of clause 1 wherein the polyamide is selected from the group consisting of nylon-6, nylon 6-6, a copolymer of nylon-6 and nylon 6-6, nylon-9, nylon-10, nylon-11, nylon-12, nylon 6-10, aromatic polyamides, elastomeric polyamides, and mixtures thereof.
3. The thermoplastic pelletizable polymer composition of clause 2 wherein the polyamide is selected from the group consisting of nylon-6, nylon 6-6, a copolymer of nylon-6 and nylon 6-6, and mixtures thereof.
4. The thermoplastic pelletizable polymer composition of clause 1 wherein the olefin is selected from the group consisting of ethylene, propylene, isobutylene, butene-1, octene, butadiene, styrene, isoprene, hexene, dodecene, dodecene-1, and tetradecene.
5. The thermoplastic pelletizable polymer composition of clause 1 wherein the olefin is ethylene.
6. A cross-linked polymer composition comprising:
    (a) a polyamide, and
    (b) a polymer polymerized from maleic anhydride and an olefin; wherein the polyamide and the polymer are compounded at a processing temperature wherein the processing temperature is sufficient to promote cross-linking.
7. The cross-linked polymer composition of clause 6 wherein the polyamide is selected from the group consisting of nylon-6, nylon 6-6, a copolymer of nylon-6 and nylon 6-6, nylon-9, nylon-10, nylon-11, nylon-12, nylon 6-10, aromatic polyamides, elastomeric polyamides, and mixtures thereof.
8. The cross-linked polymer composition of clause 6 wherein the polyamide is selected from the group consisting of nylon-6, nylon 6-6, a copolymer of nylon-6 and nylon 6-6, nylon-11, and mixtures thereof.
9. The cross-linked polymer composition of clause 6 wherein the olefin is selected from the group consisting of ethylene, propylene, isobutylene, butene-1, octene, butadiene, styrene, isoprene, hexene, dodecene, dodecene-1, and tetradecene.
10. The cross-linked polymer composition of clause 6 wherein the olefin is ethylene.
11. A method of preparing a compounded polyamide comprising the steps of:
    forming a polyamide reaction mixture by contacting the polyamide with an olefin-maleic anhydride copolymer; and
    compounding the polyamide reaction mixture at a processing temperature.
11a. A method of preparing a compounded polyamide comprising:
    compounding a polyamide mixture comprising a polyamide and an olefin-maleic anhydride copolymer at a processing temperature.
12. The method of clause 11 or 11a, wherein the olefin is selected from the group consisting of ethylene, propylene, isobutylene, butene-1, octene, butadiene, styrene, isoprene, hexene, dodecene, dodecene-1, and tetradecene.
13. The method of clause 11 wherein the olefin is ethylene.
14. The method of clause 11 or 11a, wherein the polyamide is a nylon.
15. The method of clause 11 or 11a, wherein the polyamide is selected from the group consisting of nylon-6, nylon 6-6, a copolymer of nylon-6 and nylon 6-6, nylon-9, nylon-10, nylon-11, nylon-12, nylon 6-10, aromatic polyamides, elastomeric polyamides, and mixtures thereof.
16. The method of clause 11 or 11a wherein the polyamide is selected from the group consisting of nylon-6, nylon 6-6, a copolymer of nylon-6 and nylon 6-6, and mixtures thereof.
17. The method of clause 13, wherein the olefin-maleic anhydride copolymer has a ratio of ethylene to maleic anhydride of 1:1.
18. The method of clause 17, wherein the olefin-maleic anhydride copolymer has a molecular weight of about 300 to 1,000,000.
19. The method of clause 17, wherein the olefin-maleic anhydride copolymer has a concentration of about 0.01% to about 0.5%, about 0.5% to about 1.0%, about 1.0% to about 1.5%, or 1.5% to about 3.0% w/w.
20. The method of clause 11 or 11a, wherein the processing temperature is about 230° C. to about 300° C.

21. The method of clause 11 or 11a, wherein the step of forming the polyamide reaction mixture further comprises the step of compounding a polyamide with a glass fiber.

22. The method of clause 21, wherein the glass fiber has a concentration of about 0.1% to about 30%

23. The method of clause 11 or 11a, where wherein the step of forming a polyamide reaction mixture further comprises the step of contacting a polyamide with one or more stabilizing agents.

24. The method of clause 23, wherein each of the one or more stabilizing agents is independently selected from a group consisting of cuprous iodide, potassium iodide, tris (2,4-di-tert-butylphenyl)phosphite, and N,N'-hexane-1,6-diylbis(3-(3,5-di-tert-butyl-4-hydroxyphenylpropionamide)).

25. The method of clause 23, wherein each of the one or more stabilizing agents independently has a concentration of about 0.01 to about 1.0% w/w.

26. A method of producing a compounded polyamide, comprising the steps of:
providing a polyamide mixture, where the polyamide mixture comprises an olefin-maleic anhydride copolymer; a glass fiber and; one or more stabilizing agents; and
compounding the polyamide reaction mixture at between about 230° C. and about 300° C.

26a. A method of producing a compounded polyamide, comprising compounding a polyamide mixture, where the polyamide mixture comprises an olefin-maleic anhydride copolymer; a glass fiber and; one or more stabilizing agents at a temperature of between about 230° C. and about 300° C.

27. A compounded polyamide produced by a process comprising the steps of:
forming a polyamide reaction mixture, comprising a polyamide and an olefin-maleic anhydride copolymer;
compounding the polyamide reaction mixture at a processing temperature.

27a. A compounded polyamide produced by a process comprising compounding a polyamide mixture, comprising a polyamide and an olefinic-maleic anhydride copolymer at a processing temperature.

28. The compounded polyamide of clause 27 or 27a wherein the olefin-maleic anhydride polymer is an ethylene-maleic anhydride polymer.

29. The compounded polyamide of clause 27 or 27a, wherein the polyamide is selected from the group consisting of nylon-6, nylon 6-6, a copolymer of nylon-6 and nylon 6-6, nylon-9, nylon-10, nylon-11, nylon-12, nylon 6-10, aromatic polyamides, elastomeric polyamides, and mixtures thereof.

30. The compounded polyamide of clause 27 or 27a wherein the polyamide is selected from the group consisting of nylon-6, nylon 6-6, a copolymer of nylon-6 and nylon 6-6, and mixtures thereof.

31. The compounded polyamide of clause 27 or 27a, wherein the polyamide is selected from a group consisting of nylon-6 and nylon 6-6.

32. The compounded polyamide of clause 28, wherein the ethylene maleic anhydride copolymer has a ratio of ethylene to maleic anhydride of 1:1.

33. The compounded polyamide of clause 28, wherein the ethylene-maleic anhydride copolymer has a molecular weight of about 300 to 1,000,000.

34. The compounded polyamide of clause 27 or 27a, wherein the ethylene-maleic anhydride has a concentration of about 0.01% to about 0.5%, about 0.5% to about 1.0%, about 1.0% to about 1.5%, or 1.5% to about 3.0% w/w.

35. The compounded polyamide of clause 27 or 27a, wherein the processing temperature is from about 230° C. to about 300° C.

36. The compounded polyamide of clause 27 or 27a, wherein the polyamide reaction mixture further comprises a glass fiber.

37. The compounded polyamide of clause 36, wherein the glass fiber has a concentration of about 0.1% to about 30%

38. The compounded polyamide of clause 27 or 27a, wherein the polyamide reaction mixture further comprises one or more stabilizing agents.

39. The compounded polyamide of clause 38, wherein the one or more stabilizing agents are each independently selected from the group consisting of cuprous iodide, potassium iodide, tris(2,4-di-tertbutylphenyl)phosphite, and N,N'-hexane-1,6-diylbis(3-(3,5-di-tert-butyl-4-hydroxyphenyl-propionamide)).

40. The compounded polyamide of clause 39, wherein the one or more stabilizing agents each independently has a concentration of about 0.01% w/w to about 1.0% w/w.

41. The compounded polyamide of clause 33, wherein the ethylene maleic anhydride copolymer has a molecular weight of about 60,000 to about 400,000.

42. The compounded polyamide of clause 13, wherein the ethylene maleic anhydride copolymer has a molecular weight of about 60,000 to about 400,000.

43. The compounded polyamide or polymer composite of any one of the preceding clauses wherein the polyamide is a recycled nylon.

44. An article comprising the compounded polyamide or the polymer composite of any one of clauses 1 to 42, wherein the article is selected from the group consisting of carpet fiber, apparel, an airbag, a tire, a rope, a conveyer belt, a hose, luggage, a molded auto part, a molded gun frame, a molded electrical part, a molded tool handle, toothbrush, a comb, a hairbrush, a food packaging film, an oil-resistant gasket, and bullet-resistant materials.

Further, according to additional exemplary embodiments, UV stabilizers and absorbents, halogenated or non-halogenated flame retardant additives; reinforcements such a mineral or fibers, fabrics, roving filaments, tubes and yarns, made from glass, carbon, graphite, cellulose and other natural materials; and/or aromatic high melting polymers (sometimes referred to as aramids) are included within the reaction mixture. Plasticizers, lubricants, rheology modifiers, friction modifiers, and other additives known to one skilled in the art may also be optionally added to the mixture depending on the application requirements.

According to at least one step of forming a polyamide reaction mixture, the combination of the component parts may be accomplished by any type of applicable extruder, such as a single or double screw extruder, or an applicable extruder used in conjunction with a mixer.

While conducting the compounding step in an embodiment of the method of producing a compounded polyamide of the present disclosure, the first temperature may be any temperature sufficient to melt the polyamide and promote the compounding of a polyamide with EMA. In an exemplary embodiment, with nylon-6, the temperature settings on the extruder and the processing temperature may be about 230° C. to about 300° C. In other embodiments, the temperature settings and compounding temperature may be from about 230° C. to about 260° C. or from about 220° C. to 260° C. For nylon 6-6, such a temperature may range from 250° C. to 310° C. or from 240° C. to 280° C. However, for higher melting polyamides such as Nomex® polymer, such processing temperatures are likely in the range of 280° C. to 380° C. For elastomeric polyamides such as nylon-9, nylon-10, nylon-6, 10, nylon-11 and nylon-12, the range may be considerably less, in the range of 150° C. to 250° C. It is recognized that the upper value of the compounding temperature, may be bound by the temperature at which degradation of the nylon being compounded becomes significant the lower value may be bound by the melting or softening point of the nylon.

Without being bound by theory, it is believed that nylons (also called polyamides) require the presence of a free amine group in order for it to react with the anhydride groups of the olefin-maleic anhydride copolymer (see the formula below). Illustratively, grade Ultramid B3S, which has free amine groups and is not end capped, reacts whereas Ultramid B27 which is end capped has no free amine groups available for reaction.

According to at least one embodiment of a compounded polyamide of the present disclosure, a compounded polyamide formed by the process of compounding the polyamide with an EMA is disclosed. Further optionally, the polyamide may be a nylon-6 or a nylon-66 and the EMA has a weight molecular weight of about 60,000 to about 400,000. The polyamide may also be nylon-9, nylon-12, nylon-11, nylon 4-6, or any of the polyamides listed herein. In another illustrative embodiment, the polyamide compounded with the EMA in any of the embodiments described herein may be a recycled nylon.

Recycled nylon/polyamide can include many different types of materials of varying quality from various industries. The recycled polyamide may be from post-industrial sources or post-consumer sources or from a combination of both. An

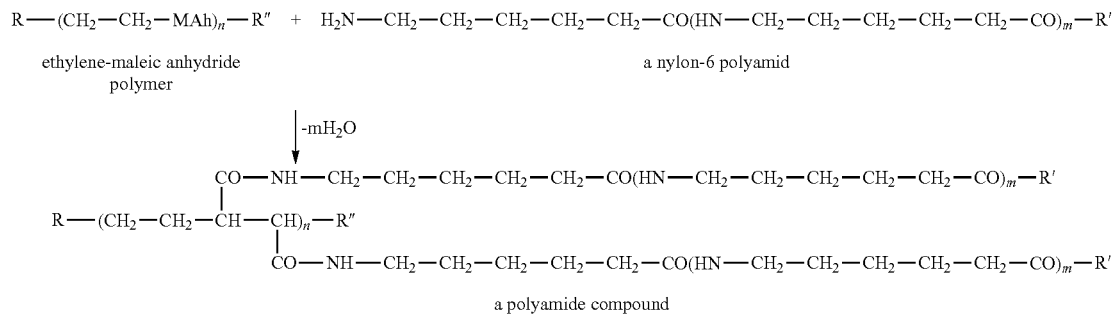

In at least one embodiment of the method of compounding a polyamide, the step of forming a polyamide reaction mixture may further comprise the step of contacting a polyamide with a glass fiber. The introduction of glass fiber may occur before or after the compounding of the polyamide with EMA. The glass fiber may have a concentration of about 0.1% to about 60%; about 10% to about 50%. Further, in an exemplary embodiment of the present disclosure, a glass fiber may have a grade and size applicable with nylon compounding.

According to other exemplary embodiments, other reinforcements may be compounded with the polyamide, including carbon nano tubes, mica, talc, calcium carbonate, wollastonite, carbon fibers, Kevlar® fibers, nano-particles made from clay and other materials. Other embodiments include fabrics, roving filaments, tubes and yarns, made from glass, cellulose and other natural materials, carbon, graphite, aromatic high melting polymers (sometimes referred to as aramids) and ceramics. A specific example is Kevlar® fibers, with a 12 micron diameter and 0.5 inch fiber length. Another example is a biaxially oriented glass fiber fabric such as VECTORPLY™ E-LTM 3610.

An exemplary embodiment of the method of producing a compounded polyamide may also comprise the step of injection molding of the polyamide. Optionally, the polyamide may be combined with the EMA directly during injection molding.

As a result of producing a compounded polyamide by an embodiment of the method of the present disclosure, the treated polyamide (i.e. compounded polyamide) was found to exhibit increased impact strength and/or increased tensile strength as compared to uncompounded polyamide. The increased impact strength may be at least about 5%, at least about 10%, at least about 15%, at least about 20%, at least about 25%, at least about 28%, at least about 30%, at least about 33%, at least about 35%, at least about 40%, or at least about 50%, greater than the uncompounded polyamide.

example of a high quality recycled nylon is non-colored nylon that has sufficient molecular weight for injection molding. Another illustrative recycled nylon is "Off-spec" or "non-prime" polyamide/nylon that does not meet specifications for its intended use or is transition material that is produced during the change over between production of one grade of nylon and another grade on nylon. This type of recycled nylon material product is priced from about 2-5% below the price of prime nylon to about 25% below the price of prime nylon depending on market conditions. Much of the recycled nylon of lower quality that is available currently goes into landfills. Illustrative sources of lower quality recycled nylon are the textile or the hosiery industry. Another source is recycled fish nets. Much of this lower quality material is a low viscosity nylon, which usually cannot be used for injection molding applications without modification as describe herein. Recycled nylon from the automotive industry is typically black and cannot be used for non-black applications. The recycled nylon may also contain one or more non-polyamide polymers. In one illustrative example carpet waste usually contains 80-85% polyamide, remaining material being polyester, polypropylene and some polyurethane. Due to poor mechanical performance such carpet waste is not typically reused and ends up in landfills. Depending upon the performance and quality of the material, polyamides prices vary. By compounding these types of recycled polyamides with EMA copolymers as described herein, these materials can be used for more value-added applications.

According to at least one additional embodiment of the compounded polyamide of the present disclosure, a reacted or compounded polyamide may be incorporated into any product where increased performance over uncompounded polyamide is desired. In an exemplary embodiment, compounded polyamide may be incorporated into any one of carpet fiber, apparel, airbags, tires, ropes, conveyer belts, hoses, luggage, molded products (such as auto parts, gun frames, electrical parts, and tool handles), personal hygiene products (such as toothbrushes), medical devices and surgical products, food packaging films, oil-resistant gaskets, defense & aerospace products, and bullet-proof materials.

According to at least one embodiment, cross-linked compositions of this disclosure prepared by using relatively higher levels of an olefin-maleic anhydride polymer (OMAP) in a polyamide matrix are used for cast or thermally laminated nylon applications. For achieving such objectives, the ratio of the OMAP is in the range of about 10% to about 50% w/w, or about 10% to about 20%. Applications for a cross-linked composition of this variety are optionally processed by methods typically used for thermoset polymers, some of which use reinforcement with fabrics made from glass fibers. Such polymers can be useful for applications ranging from metal replacement (e.g. mechanical parts, medical devices, and the like) to use in transportation. Other uses include applications in defense and aerospace. In other embodiments of these cross-linked compositions, the olefin-maleic anhydride polymer is an alternating 1:1 ethylene-maleic anhydride polymer.

As used herein, the term "compounding" generally refers to a process that mixes one or more polymers with one or more additives to produce plastic compounds in one or more steps. The materials to be mixed may be in the form of pellets, powders and/or liquids. Typically the product is in pellet form for use in other plastic-forming processes such as extrusion and injection molding Methods and Examples Materials Polyamide 6 (grade Ultramid™ B3S) and polyamide 6,6 (grade Ultramid™ A34) both prime quality from BASF were used as received, as was recycled polyamide 6. Care was taken to ensure that all grades stayed dry. A 1:1 ethylene-maleic anhydride alternating copolymer grade ZeMac™ E60 (E60) from Vertellus Specialties Inc. with a weight average molecular weight (Mw) of 60,000 was used in these illustrative examples. A 1:1 ethylene-maleic anhydride alternating copolymer grade ZeMac™ E400 (E400) from Vertellus Specialties Inc. with a weight average molecular weight (Mw) of 400,000 was also used in illustrative examples. A stabilizer package, consisting of 0.09% potassium iodide (KI), 0.01% cuprous iodide (CuI), 0.4% Irgafos™ 168 (phosphite stabilizer), and 0.5% Irganox™ 1098 (hindered phenol antioxidant), was used with all compounded samples.

General Compounded Polyamide Preparation

Composite pellets of compounded polyamide with E60 or E400 were prepared in a counter-rotating inter-meshing twin screw extruder (Bertstroff 25 mm. 32D). Polyamide-6 and recycled polyamide-6 samples were run using the temperature settings of 235, 245, 255, 245, 240, 240, 240, 240° C., while polyamide-6,6 samples were compounded using temperature settings of 250, 265, 275, 270, 270, 270, 270, 280° C. For GF-reinforced runs the glass fiber, at a loading level of 30%, was fed downstream with a side feeder.

General Testing Methods

Tensile, flexural, notched Izod impact strength and melt flow index measurements were carried out using standard ASTM methods D-638, D-790, D-256 and D-1238 respectively at 23° C. Charpy impact strength was measured using the ISO-179-2/2 method at room temperature (23° C.) and at −30° C. Heat deflection/distortion temperature was measured using ASTM method D-648. These mechanical and thermal tests were carried out without additional drying, the samples were used as molded after conditioning the test specimen as per ASTM protocol. Water absorption tests were carried after drying to equilibration to ensure that all the absorbed water has been removed and all the samples are dry. The percent increases in the amount of water absorbed were determined after 24, 48 and 72 hours.

Prime Polyamide-6

Polyamide-6 was compounded with 1% ethylene-maleic anhydride copolymer, with and without 30% glass fiber. The tensile strength, elongation and notched Izod impact strength of the resulting compounded materials are shown in TABLE 1 below.

TABLE 1

| Formulation | Nylon-6 + no additive | Nylon-6 + 1% E60 | Nylon-6 + 30% Glass Fiber + no additive | Nylon-6 + 30% Glass Fiber + 1% E60 |
|---|---|---|---|---|
| Tensile Strength at Strain (MPa) | 50 | 70.5 | 69 | 79 |
| Tensile Elongation at Break (%) | 5.9 | 8.0 | 4.9 | 9.2 |
| Tensile Elongation at Yield (%) | 5.2 | 7.9 | 4.9 | 8.8 |
| Tensile Modulus (MPa) | 1150 | 1200 | 2250 | 2400 |
| Notched Izod (ft-lb./in.) | 1.30 | 1.55 | 1.50 | 2.00 |
| Notched Izod (J/m.) | 69 | 83 | 80 | 107 |

The results of tensile strength, elongation and notched Izod impact strength shown in TABLE 1 demonstrate that the alternating copolymer enhances all three properties with and without 30% fiber glass. Typically when tensile strength is increased in most plastics with some sort of modification, elongation decreases and vice versa. It has been discovered that compounding the polyamide with EMA results in both tensile strength and elongation increases simultaneously. It is believed that these observations show that the basic structure of at least some of the polyamide is being modified into a highly branched structure with very high molecular weight which results in a stronger and tougher compounded polyamide.

During compounding an increase in both viscosity and torque is observed. When a polyamide grade with no end groups was used, no increase of viscosity or mechanical properties was observed. It is believed that this indicates that no amidation reaction can occur in the absence of amine end groups on the polyamide. It was also observed that cross-linking can occur at high loadings of the EMA (>10%) and the resulting compounded material does not flow. Use of other materials which have one reactive group i.e., one anhydride, (for example polyethylene grafted with maleic anhydride) or modifier with one reactive group at each end show only a slight increase in viscosity and little increase in mechanical properties compared to the use of EMA copolymers (unique structures with thousands of reactive groups on each molecular chain) disclosed herein. This increase in viscosity also results in a reduction of melt flow rate of polyamide-6 as shown in TABLE 2.

TABLE 2

| Additive | Melt Flow Rate @ 235° C. & 1 kg (g/10 min) |
|---|---|
| not compounded | 9.7 |
| 0.1% E60 | 4.3 |

TABLE 2-continued

| Additive | Melt Flow Rate @ 235° C. & 1 kg (g/10 min) |
|---|---|
| 0.3% E60 | 1.7 |
| 0.5% E60 | 1.0 |

Prime Polyamide-6,6

It was observed during compounding that polyamide 6,6 generated higher viscosity increase and torque at the same loading levels of EMA. This may be attributed partly to the higher temperature at which polyamide-6,6 is processed compared to polyamide-6 but also because it is understood that polyamide-6,6 typically has amine end groups at both ends. Similar to the results for polyamide-6, mechanical properties of polyamide-6,6 are also improved while the melt flow rate decreases. In addition we observed an increase in heat deflection temperature as shown in TABLE 3 below.

TABLE 3

| Additive | Melt Flow Rate @ 275° C. & 5 kg (g/10 min) | Heat Deflection Temp. ° C. at 1.82 Mpa (264 psi) |
|---|---|---|
| not compounded | 142.05 | 59.6 |
| no additive | 29.06 | 70.5 |
| 0.1% E60 | 21.12 | 74.1 |
| 0.3% E60 | 8.98 | 71.0 |
| 0.5% E60 | 2.27 | 71.3 |

Recycled Nylon-6

The recycled polyamide used for this study was primarily nylon-6 from an industrial source. Due to the presence of some nylon-6,6 in this recycled polyamide, the melt flow rate is lower than what would typically be expected from a recycled stream with just polyamide-6. During compounding it generated less torque than the corresponding prime nylon-6. Without being bound by theory, it is believed that the lower torque is due to the expected degradation caused by additional heat history of the recycled nylon-6 compared to prime nylon-6. TABLE 4 shows the decrease of melt flow rate in recycled polyamide compounded with E60. It is believed that this decrease in melt flow rate is due to chain extension and the resultant branching. The resulting shear thinning enabled excellent injection molding contrary to what one might expect from the fractional melt flow rates obtained when ASTM test specimens were molded.

TABLE 4

| Additive | Melt Flow Rate (ASTM D-1238) 235° C. w/1 kg (g/10 min) |
|---|---|
| no E60 | 13 |
| no additive | 6.2 |
| 0.1% E60 | 1.17 |
| 0.3% E60 | 0.80 |
| 0.5% E60 | 0.44 |
| 1% E60 | 0.5 |
| 3% E60 | 1.6 |
| Prime Nylon-6 | 9.65 |

The tensile strength of injection molded specimens was measured as described in protocol ASTM D638. The results are shown in TABLE 5. Various commercial grades of prime polyamide-6 grades differ slightly in terms of tensile strength values as indicated on the specification data sheets provided by the supplier.

As the data in TABLE 5 shows, after reactive compounding of the recycled polyamide with the ethylene-maleic anhydride alternating copolymer to yield compounded recycled polyamide, the tensile strength values match or approach the range of values of prime polyamide grades (75 to 85 MPa). Other properties of the compounded recycled polyamide are also improved. TABLE 6 shows the flexural modulus properties of recycled polyamide as a function of the addition of low loadings of the same alternating copolymer of ethylene and maleic anhydride.

This increase in flexural modulus of the compounded recycled polyamide matches or exceeds the similar range of flexural modulus of the various grades of prime polyamide-6 available from different suppliers. An increase in flexural strength at break is also observed for the compounded recycled polyamide as shown in TABLE 6. It is seen from the values for both flexural modulus and flexural strength at break shows that the values increase as a function of the amount of added alternating copolymer from 0.1 to 0.5%. The values do not appear to increase further when the percentage of added E60 is increased further.

TABLE 5

Increase of tensile strength of recycled polyamide due to E60 reaction.

| Compounded Recycled Polyamide Additive | TENSILE PROPERTIES (ASTM D638) | |
|---|---|---|
| | Tensile Strength @ Yield (MPa) | Elongation @ Break (%) |
| no E60 | 61.1 | 19.47 |
| no additive | 78.2 | 18.24 |
| 0.1% E60 | 78.5 | 12.66 |
| 0.3% E60 | 80.2 | 17.58 |
| 0.5% E60 | 79.5 | 12.79 |
| 1% E60 | 82.0 | 29.17 |
| 3% E60 | 80.4 | 15.91 |
| Prime Nylon-6 | 83.6 | 12.41 |

TABLE 6

Increase of flexural modulus and strength of recycled polyamide due to E60 reaction.

| Additive | FLEX ASTM D790 | |
|---|---|---|
| | Flex. Modulus (Mpa) | Flex Strength @ Break (Mpa) |
| no E60 | 2385 | 77.2 |
| no additive | 2632 | 102.5 |
| 0.1% E60 | 2689 | 105.7 |
| 0.3% E60 | 2749 | 114.0 |
| 0.5% E60 | 3016 | 121.1 |
| 1% E60 | 2867 | 110.8 |
| 3% E60 | 2866 | 113.3 |
| Prime Nylon-6 | 2796 | 113.8 |

The Izod impact strength for compounded recycled polyamide was measured according to protocol ASTM D256. The results measured at room temperature (23° C.) and at −30° C. are shown in TABLE 7. The results show an increase in as a function of the addition level of the alternating copolymer at both room temperature and at −30° C. What is surprising, however, is that the values measured at low temperature unexpectedly are higher than the values measured at room temperature and are higher than the values measured for prime nylon-6.

The Charpy impact strength measured at 23° C. and −30° C. are shown in TABLE 8. Increases in the Charpy impact strength are observed compared to without adding the alternating copolymer. However the increase is not progressive at 0.5% loading level at 23° C. When compared to the values for prime polyamide, they are exceeded at 23° C. for all three loadings but only at 0.5% at −30° C.

TABLE 7

Increase of Izod impact strength of recycled polyamide compounded with E60 measured at 23° C. and −30° C.

| Additive | IZOD IMPACT (ft-lb/in) ASTM D256 | |
|---|---|---|
| | @ 23° C. | @ −30° C. |
| no E60 | 0.52 | 0.42 (CB) |
| no additive | 0.87 | 0.45 (CB) |
| 0.1% E60 | 0.96 | 1.01 (CB) |
| 0.3% E60 | 1.05 | 1.30 (CB) |
| 0.5% E60 | 1.32 | 1.39 (CB) |
| Prime Nylon-6 | 1.33 (CB) | 0.46 (CB) |

TABLE 8

Increase of Charpy impact strength of recycled polyamide compounded with E60 measured at room temperature (23° C.) and −30° C.

| Additive | CHARPY IMPACT ISO-179-2/2 (KJ/m$^2$) | |
|---|---|---|
| | @ 23° C. | @ −30° C. |
| no E60 | 33.8 | 24.7 |
| no additive | 46.9 | 19.9 |
| 0.1% E60 | 40.3 | 23.7 |
| 0.3% E60 | 48.4 | 29.2 |
| 0.5% E60 | 40.1 | 39.4 |
| Prime Nylon-6 | 32.2 | 22.3 |

It is appreciated that the addition of the polar E60 as an additive can result in an increase of the water absorption of the compounded polyamide samples. Water absorption measurements were carried out after drying the sample to equilibration to ensure that they were dry. The amount of water absorbed was determined after 24, 48 and 72 hours. As shown in TABLE 9 there is only a small increase in water absorption observed in the samples of polyamide compounded with the E60 copolymer.

TABLE 9

| Additive | WATER ABSORPTION (%) | | |
|---|---|---|---|
| | 24 Hrs. | 48 Hrs. | 72 Hrs. |
| no E60 | 1.03 | 1.48 | 1.79 |
| no additive | 1.02 | 1.42 | 1.77 |
| 0.1% E60 | 1.28 | 1.69 | 2.24 |
| 0.3% E60 | 0.88 | 1.32 | 1.56 |
| 0.5% E60 | 0.69 | 1.10 | 1.97 |
| 1% E60 | 1.09 | 1.50 | 1.8 |
| 3% E60 | 0.87 | 1.38 | 1.82 |

Example

In determining the effect of ethylene maleic anhydride copolymers (EMA) on nylon-6 and nylon 6-6, both types of nylon were compounded with 30% glass fiber, 1.4% EMA, and a stabilizer package comprising the combination of compounds disclosed in TABLE 2. Pellets of the compounded nylon were then molded into ASTM test specimens and the following properties were tested: Notched Izod Impact Strength, Unnotched Izod Impact Strength, as well as for tensile properties, strain at break and strain at yield. Compounding of the nylon, glass fiber, EMA and the stabilizer package was performed on a twin screw extruder with all components added to a hopper. According to the exemplary embodiment, processing melt temperature of the nylon mixture was 260° C. for nylon-6,6 compounds and 240° C. for nylon-6 compounds. Illustrative results of the analysis of the properties of compounded nylon as compared to the uncompounded nylon are shown in TABLE 10. The fiberglass grade used in the mixture was a high performance E-glass chopped strand with a 10μ diameter and a 4.5 mm length, typically used in extrusion compounding with polyamide resin systems.

TABLE 10

Comparison of Physical Properties of Nylon Compounds

| Formulation (all with 30% E-Glass Fiber*) | Nylon-6 no EMA | Nylon-6 w/E400 | Nylon-6 w/E60 |
|---|---|---|---|
| Tensile Strength (MPa) | 176.3 | 162.1 | 160.9 |
| Tensile Elongation (%) | 3.70 | 4.86 | 5.50 |
| Notched Izod (ft-lb./in.) | 1.80 | 1.62 | 2.30 |
| UnNotched Izod (ft-lb./in.) | 20.5 | 17.5 | 23.1 |

TABLE 11

Stabilizer Composition as a Function of Total Compound Weight

| Compound | % w/w to total 100% |
|---|---|
| Cuprous Iodide | 0.01% |
| Potassium Iodide | 0.09% |
| Irgafos 168 (phosphite) | 0.40% |
| Irganox 1098 (hindered phenol) | 0.50% |

In each of the following TABLES 12-15, except for the first entry, each polymer was compounded with the stabilizer composition shown in TABLE 11

TABLE 12

Melt Flow Rate of Recycled Nylon-6 @ 235° C. & 1 kg (g/10 min)

| Not compounded | No additive | 0.1% E60 | 0.3% E60 | 0.5% E60 | 1% E60 | 3% E60 |
|---|---|---|---|---|---|---|
| 13.0 | 6.2 | 1.2 | 0.8 | 0.4 | 0.5 | 1.6 |

TABLE 13

Tensile Strength of Recycled Nylon-6 (MPa)*

| Not compounded | No additive | 0.1% E60 | 0.3% E60 | 0.5% E60 | 1% E60 | 3% E60 |
|---|---|---|---|---|---|---|
| 61.1 | 78.2 | 78.5 | 80.2 | 79.5 | 82.0 | 80.4 |

*Values for Prime Nylon are in the range of about 65-71 MPa

TABLE 14

Flex Modulus of Recycled Nylon-6 (MPa)*

| Not compounded | No additive | 0.1% E60 | 0.3% E60 | 0.5% E60 | 1% E60 | 3% E60 | 1% E400 |
|---|---|---|---|---|---|---|---|
| 2385 | 2632 | 2689 | 2749 | 3016 | 2867 | 2866 | 3000 |

*Values for Prime Nylon are in the range of about 2600-2800 MPa

TABLE 15

Flex Strength @ Break of Recycled Nylon-6 (MPa)*

| Not compounded | No additive | 0.1% E60 | 0.3% E60 | 0.5% E60 | 1% E60 | 3% E60 | 1% E400 |
|---|---|---|---|---|---|---|---|
| 77.24 | 102.52 | 105.70 | 113.95 | 121.09 | 110.78 | 113.3 | 119.15 |

*Values for Prime Nylon are in the range of about 100-108 MPa

TABLE 16

At 0.1% ZeMac E-60 in Prime Nylon 6-6 (BASF's Ultramid A34), the compounded polyamide shows improvement of several properties:

| Additive | Tensile Properties ASTM D638 | | | | Flexural ASTM D790 | | Izod Impact ASTM D256 | | Charpy Impact ISO-179-2/2 | | HDT ASTM D648 264 psi (° C.) | MFI ASTM D1238 275° C. & 5 Kg (g/10 min) | Specific Gravity ASTM D792 (g/ml) |
|---|---|---|---|---|---|---|---|---|---|---|---|---|---|
| | Modulus (MPa) | Stress @ Yield (MPa) | Stress @ Break (MPa) | Strain @ Break (%) | Modulus (MPa) | Stress @ Break (MPa) | Room Temp (ft-lb/in) | -30° C. (ft-lb/in) | Room Temp (KJ/m^2) | -30° C. (KJ/m^2) | | | |
| not compounded | 2653 | 75.4 | 56.9 | 33.6 | 2787 | 100.8 | 0.54 (CB) | 0.48 (CB) | 36.00 (NB) | 33.6 (NB) | 59.6 | 142.1 | 1.14 |
| 0.1% E60 | 2719 | 84.8 | 66.1 | 13.1 | 2781 | 112.3 | 1.07 (CB) | 0.42 (CB) | 35.0 (NB) | 35.8 (NB) | 74.1 | 21.1 | 1.14 |

MFI - melt flow index,
HDT - Heat Deflection Temperature,
NB - no break,
CB - complete break
HB - half break

TABLE 17

Prime nylon-6 (BASF's Ultramid B3S) compounded with E60 shows improvement in the following properties:

| Additive | Tensile Properties ASTM D638 | | Flexural ASTM D790 | | Izod Impact ASTM D256 | Charpy Impact ISO-179-2/2 | | HDT ASTM D648 264 psi (° C.) | MFI ASTM D1238 235° C. w/1 kg (g/10 min) |
|---|---|---|---|---|---|---|---|---|---|
| | Stress @ Yield (MPa) | Strain @ Break (%) | Modulus (MPa) | Stress @ Break (MPa) | -30° C. (ft-lb/in) | 23° C. (KJ/m^2) | -30° C. (KJ/m^2) | | |
| not compounded | 83.6 | 12.4 | 2796.1 | 113.8 | 0.46 (CB) | 32.2 (NB) | 22.3 (CB) | 62.1 | 9.65 |
| 0.1% E60 | 78.4 | 11.4 | 2680.2 | 105.4 | 0.38 (CB) | 42.9 (NB) | 24.4 (CB) | 59.1 | 4.34 |
| 0.3% E60 | 78.8 | 14.5 | 2747.6 | 106.9 | 0.46 (CB) | 44.6 (NB) | 23.9 (CB) | 55.3 | 1.73 |
| 0.5% E60 | 85.4 | 15.0 | 2992.0 | 121.3 | 0.61 (CB) | 49.7 (NB) | 27.0 (CB) | 56.5 | 0.97 |

TABLE 18

Properties of prime nylon-6 (BASF's Ultramid B3S) compounded with 30% glass fiber and E60.

| Additive | Tensile Properties ASTM D638 | | | | Flexural ASTM D790 | | | Izod Impact ASTM D256 | | Charpy Impact ISO-179-2/2 | | HDT ASTM D648 264 psi (° C.) |
|---|---|---|---|---|---|---|---|---|---|---|---|---|
| | Modulus (MPa) | Stress @ Yield (MPa) | Stress @ Break (MPa) | Strain @ Break (%) | Modulus (MPa) | Stress @ Break (MPa) | Stress @ Yield (MPa) | Room Temp (ft-lb/in) | -30° C. (ft-lb/in) | Room Temp (KJ/m^2) | -30° C. (KJ/m^2) | |
| 0.3% E60 | 5586 | 78.8 | 78.6 | 3.17 | 7263 | 112.6 | 24.6 | 1.13 (CB) | 0.77 (CB) | 6.24 (CB) | 5.80 (CB) | 198.8 |

TABLE 18-continued

Properties of prime nylon-6 (BASF's Ultramid B3S) compounded with 30% glass fiber and E60.

| | Tensile Properties ASTM D638 | | | | Flexural ASTM D790 | | | Izod Impact ASTM D256 | | Charpy Impact ISO-179-2/2 | | HDT |
|---|---|---|---|---|---|---|---|---|---|---|---|---|
| Additive | Modulus (MPa) | Stress @ Yield (MPa) | Stress @ Break (MPa) | Strain @ Break (%) | Modulus (MPa) | Stress @ Break (MPa) | Stress @ Yield (MPa) | Room Temp (ft-lb/in) | −30° C. (ft-lb/in) | Room Temp (KJ/m^2) | −30° C. (KJ/m^2) | ASTM D648 264 psi (° C.) |
| 0.5% E60 | 5547 | 82.9 | 82.5 | 3.34 | 6744 | 122.9 | 130.9 | 1.13 (CB) | 0.73 (CB) | 7.09 (CB) | 7.62 (CB) | 192.3 |

TABLE 19

Properties of prime nylon-6,6 (BASF's Ultramid A-34) with 30% glass fiber.

| 30% GF in Nylon 6-6 (Ultramid A34) Additive | Tensile Properties ASTM D638 | | | | Izod Impact ASTM D790 | | Charpy Impact ASTM D256 | | Charpy ISO-179-2/2 | |
|---|---|---|---|---|---|---|---|---|---|---|
| | Tensile Modulus (MPa) | Tensile Strength @ Yield (MPa) | Tensile Stress @ Break (MPa) | Tensile Strain (Elongation) @ Break (%) | Modulus (MPa) | Flex Strength @ Break (MPa) | 23° C. (ft-lb/in) | −30° C. (ft-lb/in) | 23° C. (KJ/m^2) | −30° C. (KJ/m^2) |
| 0.3% E60 | 6548 | 97.1 | 97.7 | 2.86 | 7471 | 140.6 | 0.94 (CB) | 0.71 (CB) | 5.50 (CB) | 5.68 (CB) |
| 0.5% E60 | 5723 | 102.8 | 102.5 | 3.36 | 6873. | 144.6 | 0.93 (CB) | 0.67 (CB) | 6.79 (CB) | 6.82 (CB) |

Example

According to this example, the effect of reacting recycled nylon with varying ethylene maleic anhydride copolymers (EMA) was evaluated. According to at least one exemplary embodiment, recycled nylon was processed with EMA as discussed in further detail below, and the reaction product was evaluated for resistance to anti-freeze degradation due to hydrolysis and impact strength as compared with untreated recycled nylon. The results indicate that processing nylon and other polyamides with EMA can improve both the resistance to anti-freeze degradation due to hydrolysis properties and the impact strength of the composition over uncompounded polyamides.

Compounded nylon-6 exhibited an increase in notched Izod impact strength from 3 ft-lb/in for uncompounded nylon-6 to between 3.78 ft-lb/in and 4.72 ft-lb/in. In addition to the increase in resistance to anti-freeze degradation due to hydrolysis and impact strength, compounded nylon is expected to display an increase in tear strength, a reduction in creep, and a decrease of the coefficient of linear thermal expansion.

Example

The properties of various nylon-6 (PA6) blends (as shown in TABLE 20) were tested with and without ethylene-maleic anhydride copolymer (EMA) to determine the effect that treatment of nylon-6 with EMA has on the physical characteristics of nylon-6. In performing the treatment of nylon-6, the nylon-6/EMA mixture was blended in a co-rotating twin screw extruder (Leistritz, ZSE, 27HP, D=40 mm), and then injection molded with an injection molding machine (Cincinnati Milacron-Fanuc, Roboshot, 55USTON, 1.95 oz) into standard tensile and impact bars. The compounding conditions in which nylon-6 was mixed are shown in TABLE 21. Additionally, the injection molding conditions are shown in TABLE 22. Further, prior to mixing, all nylon-6 were pre-dried at 85° C. overnight. Properties of several nylon-6 blends with EMA are shown in TABLES 12-15

TABLE 20

Nylon Blend Components

| Blend | Polymer Content [phr] | Filler Content [phr] | EMA Content [phr] |
|---|---|---|---|
| Nylon-6 | 100 | 0 | 0 |
| Nylon-6 + EMA** | 100 | 0 | 10 |
| Nylon-6 + EMA | 100 | 0 | 1 |
| Nylon-6 + GF | 67 | 33 | 0 |
| Nylon-6 + GF + EMA** | 70 | 30 | 10 |
| Nylon-6 + GF + EMA* | 70 | 30 | 1 |

TABLE 21

PA6 Compounding Conditions

| | Temp. [° C.] | RPM | Torque [%] | Pressure [psi] | Feed [%] |
|---|---|---|---|---|---|
| Nylon-6 + GF | 200-230-240 | 50 | 60 | 80 | 20 |
| Nylon-6 + GF + EMA | 200-230-240 | 65 | 30 | 310 | 20 |
| Nylon-6 + EMA | 200-230-240 | 65 | 30 | 350 | 25 |
| Nylon-6 | 200-220-230 | 50 | 40 | 30 | 25 |

TABLE 22

Injection Molding Conditions

| | Barrel Temp. [° F.] | Mold Temp. [° F.] | Cooling Time [sec] |
|---|---|---|---|
| Nylon-6 + GF | 440-465 | 150 | 30 |
| Nylon-6 + GF + EMA | 440-465 | 150 | 30 |

TABLE 22-continued

Injection Molding Conditions

|  | Barrel Temp. [° F.] | Mold Temp. [° F.] | Cooling Time [sec] |
|---|---|---|---|
| Nylon-6 + EMA | 440-465 | 150 | 30 |
| Nylon-6 | 440-465 | 150 | 30 |

GF - glass fiber

All samples were tested for impact properties according to ASTM D256 with a 2 lb-ft pendulum, and tensile properties according to ASTM D638 at a 50 mm/min cross-head speed. In determining these properties, Tensile Modulus (as shown in TABLE 1) indicates the force to bend. It will be appreciated that as the results increase, stiffness of the sample increases, while as the results lower, flexibility increases. As shown in TABLE 1, the strain at break was calculated as a percentage, where high numbers indicate stretchability before the sample breaks. Strain at yield, shown in TABLE 1, was calculated for each sample, indicating the force at apex prior to reduction. In other words, as the material stretches, it requires more force to stretch, until it reaches a "neck" point, where the sample thins out enough to require less force to stretch. In general, it will be appreciated that brittle materials do not neck. Further, as shown in TABLE 1, indicates the strain at yield, denoting the percentage change in length, where a higher value indicates the longer the sample must stretch before it finally breaks. Lastly, samples were tested for impact strength, which is the force required to break the sample. This is a high speed impact test, in which the higher the number the higher the impact strength. Each of these tests were run 4-5 times and the average reported.

Example 40 g. of nylon-6 pellets and 4 g. of ZeMac® E-60 (E60) were melt mixed in a Brabender laboratory size mixing bowl, preheated to 245° C. and mixed until all pellets were molten and the mixture well fluxed. At ratios of at and above 10% the ethylene-maleic anhydride copolymer did not flow, and appeared to crosslink the polyamide.

Example

Molded tensile bars are immersed in radiator fluid (commercially available Prestone® Ready to Use Premixed Antifreeze) at 125° C. for up to 3000 hours (500 hour intervals). One set of 5 samples for each formulation is removed from the test fluid at 500 hour intervals, washed with water, wiped dry and its tensile properties tested. Resistance to hydrolysis is demonstrated by comparing the tensile properties of the treated bars with untreated bars.

While various embodiments of methods of production of compositions, and methods of use of the compositions have been described in considerable detail herein, the embodiments are merely offered by way of non-limiting examples of the invention described herein. Many variations and modifications of the embodiments described herein will be apparent in light of the disclosure. It will therefore be understood that various changes and modifications may be made, and equivalents may be substituted for elements thereof, without departing from the scope of the invention. Indeed, this disclosure is not intended to be exhaustive or to limit the scope of the invention. The scope of the invention is to be defined by the appended claims, and by their equivalents.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. It will be appreciated that other sequences of steps may be possible. Therefore, the particular order of the steps disclosed herein should not be construed as limitations on the claims. In addition, the claims directed to a method and/or process should not be limited to the performance of their steps in the order written, and it will be readily appreciated that the sequences may be varied and still remain within the spirit and scope of the present invention.

It is therefore intended that the invention will include, and this description and the appended claims will encompass, all modifications and changes apparent based on this disclosure.

What is claimed is:

1. A compounded polymer comprising:
   (a) a polyamide; and
   (b) an olefin-maleic anhydride polymer copolymerized from maleic anhydride and an olefin selected from the group consisting of ethylene, propylene, isobutylene, butene-1, octene, butadiene, isoprene, hexene, dodecene, dodecene-1, and tetradecene; wherein the compounded polymer is formed by compounding the polyamide and the olefin-maleic anhydride copolymer and wherein the olefin-maleic anhydride copolymer has a molar ratio of maleic anhydride to the olefin of about 1:10 to about 10:1 and the olefin-maleic anhydride copolymer is present at a concentration of about 0.01% to about 5.0% w/w of the compounded polymer.

2. The compounded polymer of claim 1 wherein the polyamide is selected from the group consisting of nylon-6, nylon 6-6, a copolymer of nylon-6 and nylon 6-6, nylon-9, nylon-10, nylon-11, nylon-12, nylon 6-10, aromatic polyamides, elastomeric polyamides, and mixtures thereof.

3. The compounded polymer of claim 1 wherein the olefin is ethylene.

4. The compounded polymer of claim 3, wherein the olefin-maleic anhydride polymer has a ratio of ethylene to maleic anhydride of 1:1.

5. The compounded polymer of claim 1, wherein the olefin-maleic anhydride polymer has a molecular weight of about 300 to 1,000,000.

6. The compounded polymer of claim 5, wherein the olefin-maleic anhydride polymer has a molecular weight of about 60,000 to about 400,000.

7. The compounded polymer of claim 1, wherein the olefin-maleic anhydride polymer is present at a concentration of about 0.01% to about 0.5%, about 0.5% to about 1.0%, about 1.0% to about 1.5%, or 1.5% to about 3.0% w/w.

8. The compounded polymer of claim 1, wherein the compounded polymer is formed by compounding the polyamide and the polymer at a processing temperature from about 230° C. to about 300° C.

9. A composition comprising the compounded polymer of claim 1 and a glass fiber.

10. A composition comprising the compounded polymer of claim 1 and one or more stabilizing agents.

11. A method of preparing a compounded polyamide comprising:
   compounding a polyamide mixture comprising a polyamide and an olefin-maleic anhydride copolymer at a processing temperature wherein the olefin is selected from the group consisting of ethylene, propylene, isobutylene, butene-1, octene, butadiene, isoprene, hexene, dodecene, dodecene-1, and tetradecene wherein the olefin-maleic anhydride copolymer has a molar ratio of maleic anhydride to the olefin of about 1:10 to about 10:1 and the olefin-maleic anhydride copolymer is present at a concentration of about 0.01% to about 5.0% w/w of the compounded polymer.

12. The method of claim 11, wherein the olefin is ethylene.

13. The method of claim 12, wherein the olefin-maleic anhydride copolymer has a molecular weight of about 60,000 to about 400,000.

14. The method of claim 11, wherein the polyamide is a nylon.

15. The method of claim 12, wherein the olefin-maleic anhydride copolymer has a ratio of ethylene to maleic anhydride of 1:1.

16. The method of claim 15, wherein the olefin-maleic anhydride copolymer has a molecular weight of about 300 to 1,000,000.

17. The method of claim 15, wherein the olefin-maleic anhydride copolymer has a concentration of about 0.01% to about 0.5%, about 0.5% to about 1.0%, about 1.0% to about 1.5%, or 1.5% to about 3.0% w/w.

18. The method of claim 11, wherein the processing temperature is about 230° C. to about 300° C.

19. The method of claim 11, wherein the polyamide mixture further comprises a glass fiber.

20. The method of claim 11, wherein the polyamide mixture further comprises one or more stabilizing agents.

* * * * *